United States Patent [19]
Tilley et al.

[11] 3,806,863
[45] Apr. 23, 1974

[54] METHOD OF COLLECTING SEISMIC DATA OF STRATA UNDERLYING BODIES OF WATER

[75] Inventors: Aubra E. Tilley; Roger D. Judson, both of Houston, Tex.; Robert J. S. Brown, Fullerton, Calif.

[73] Assignee: Chevron Research Company, San Francisco, Calif.

[22] Filed: June 6, 1973

[21] Appl. No.: 366,384

Related U.S. Application Data

[63] Continuation of Ser. No. 199,910, Nov. 18, 1971, abandoned, which is a continuation-in-part of Ser. No. 787,917, Dec. 30, 1968, abandoned.

[52] U.S. Cl. ........................... 340/7 R, 340/15.5 TL
[51] Int. Cl. ............................................... G01v 1/38
[58] Field of Search ..................... 340/7 R, 15.5 TL

[56] References Cited
UNITED STATES PATENTS
3,597,727  8/1971  Judson et al. ................. 340/15.5 CP Primary Examiner—Maynard R. Wilbur
Assistant Examiner—N. Moskowitz
Attorney, Agent, or Firm—H. D. Messner; R. L. Freeland, Jr.

[57] ABSTRACT

In accordance with the present invention, two-dimensional subsurface coverage is obtained with a continuously moving marine seismic exploration system including repetitive seismic sources mounted aboard first and second shooting boats and a plurality of hydrophones trailing behind a separate recording boat flanked by the shooting boats. The seismic source of one of the shooting boats is fired at a repetitive time interval as that shooting boat traverses the flanking zigzag course line including a firing leg, or segment, oblique to the base course of the recording boat. Preferably, the shooting boat traverses the zigzag course line at a velocity V' equal to $$V/\cos \alpha$$

where V is the velocity of the recording boat along the base course line and $\alpha$ is the included angle between the base line and the oblique firing leg of the zigzag course of the shooting boat. The shooting boat proceeds along the firing leg from a position near to the base course of the recording boat to its sideways extreme position, or vice versa.

22 Claims, 14 Drawing Figures

INVENTORS
AUBRA E. TILLEY
ROBERT J. S. BROWN
ROGER D. JUDSON
BY
ATTORNEYS

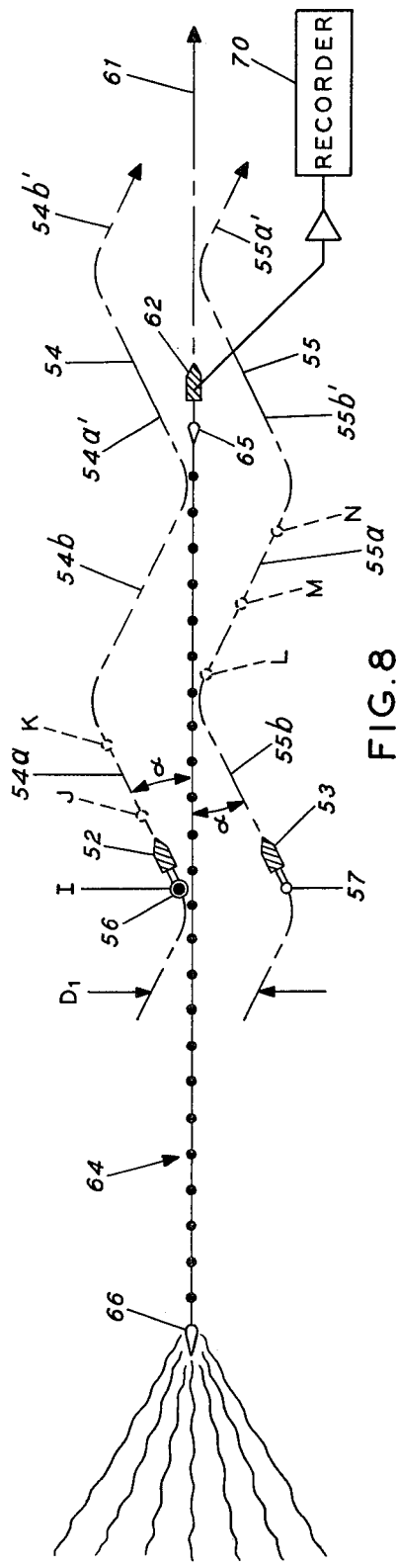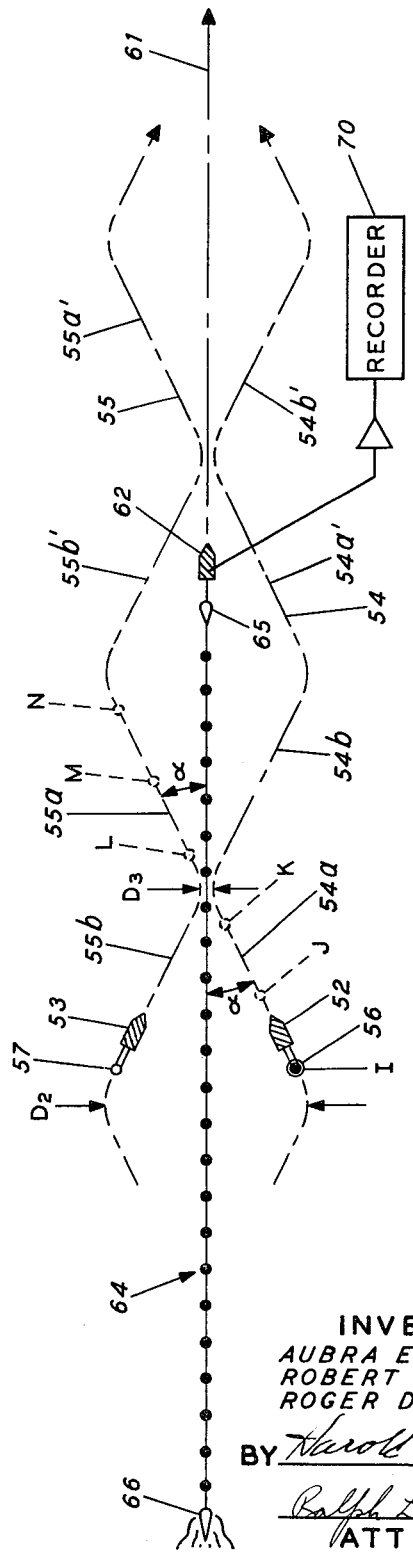

METHOD OF COLLECTING SEISMIC DATA OF STRATA UNDERLYING BODIES OF WATER

This is a continuation of application Ser. No. 199,910, filed Nov. 18, 1971, now abandoned, which is a continuation in-part of Application Ser. No. 787,917 filed Dec. 30, 1968, for "METHOD OF COLLECTING SEISMIC DATA OF STRATA UNDERLYING BODIES OF WATER".

This invention relates to marine seismic exploration and more particularly, to a method of collecting, processing and displaying areal marine seismic data by obtaining two-dimensional subsurface coverage with a continuous marine exploration system including a repetitive seismic source. In the present invention the areal seismic information is displayed in a form which permits true visualization of three-dimensional subsurface strata within a surveyed earth formation below a body of water.

Conventional seismology works best when the structures being identified have their maximum depth variation in the direction of the line of survey. The seismic techniques involved in the present invention are not so limited to have the additional advantage of being useful where the maximum depth intervals run obliquely or perpenducular to the line of survey.

In the art of seismic exploration, various attempts have been made to increase the signal-to-noise ratio of seismic data. Noise includes random noise such as instrument noise as well as coherent noise such as reverberations, multiples and ghosts. One of the most successful techniques of reducing random noise including certain types of coherent noise is known as multiple coverage or common depth point coverage (CDP).

In CDP coverage, a seismic source offset a common distance from the geophone spread is advanced a selected in-line distance after a first recording has been made. The geophone spread is advanced the same distance. A second recording is then made. By processing steps, traces related to common depth points are summed, resulting in enhanced traces having increased signal-to-noise ratios.

Since these traces are also associated with source-geophone pairs having sufficiently different source-to-geophone spacings, the coherent noise level of the enhanced traces is significantly attenuated over that in the original traces.

Another successful technique of reducing random noise is known as cross beam steering and is described in a copending application assigned to the assignee of the present application entitled "Method of Attenuating Multiple Seismic Signals in the Determination of In-Line and Cross Dips Employing Cross Steered Seismic Data", Roger D. Judson et al, filed Dec. 30, 1968, Ser. No. 787,788.

In the method of the aforementioned application, a line of geophones is employed in conjunction with regularly spaced, oblique cross lines of seismic source points. As the seismic source is advanced along the cross line of seismic source points, there is provided a series of locational traces associated with a uniform continuous distribution of two-dimensional subsurface coverage. After locational traces associated with cross lines of center points formed between all source-geophone pairs producing the locational traces are summed, as by beam steering, after static and dynamic corrections have been applied, there is produced a subset of cross directional traces having significant signal-to-noise ratios for use in determining the three-dimensional stratal configuration of the subsurface under exploration. Further, the directional traces have significantly improved primary-to-multiple signal ratios since the cross aligned locational traces are associated with center points of significantly different geophone-to-source point spacings. With this uniform subsurface coverage, both in-line and cross dips of the subsurface formation along coordinate positions along the line of survey can be determined so that a three-dimensional picture of the subsurface structure can be produced. In this manner, the subsurface structure can be identified even though its principal axis is oblique to the line of survey.

For marine operations, there are several problems in obtaining two-dimensional subsurface coverage not encountered in land operations. In land operations, geographical locations of the seismic energy source of the detector spread remain fixed during a single recording. Then, by various methods of programming and movement of the source relative to the detector spread, or vice-versa, a series of locational traces related to a two-dimensional array of center points can be obtained. On the seas, however, the detector spread floating free in the water behind even a stationary recording boat varies in position with time. Furthermore, if the seismic energy source, which may be dynamite, is fired by a stationary, or slowly moving, shooting boat, variation in the position of the shooting boat relative to the detector spread also occurs. Usually, the conventional practice is to have the recording boat slow to a slow trolling velocity at the time a record is made during which time the detector spread and the boats may drift apart to new positions. The variation in position of the detector spread with respect to the seismic source location creates formidable problems in the obtaining of locational traces associated with a true two-dimensional grid of center points.

In accordance with the present invention, two-dimensional subsurface coverage is obtained with a continuously moving marine seismic exploration system including repetitive seismic sources mounted aboard first and second shooting boats and a plurality of hydropnones trailing behind a separate recording boat flanked by the shooting boats. The seismic source of one of the shooting boats is fired at a repetitive time interval as that shooting boat traverses the flanking zigzag course line including a firing leg, or segment, oblique to the base course of the recording boat. Preferably, the shooting boat traverses the zigzag course line at a velocity $V'$ equal to $$V/\cos \alpha$$

where $V$ is the velocity of the recording boat along the base course line and $\alpha$ is the included angle between the base line and the oblique firing leg of the zigzag course of the shooting boat. The shooting boat proceeds along the firing leg from a position near to the base course of the recording boat to its sideways extreme position.

After the first shooting boat terminates its oblique firing leg, the second shooting boat begins a firing run along a second zigzag course line on the opposite flank of the recording boat. As the second boat turns onto its firing leg of the second zigzag course line, the first shooting boat also changes course in parallel therewith along a return leg of the first zigzag course line parallel to the course of the second shooting boat. When the second shooting boat terminates its firing run, the first shooting boat is thus in position again to change its heading to a new firing leg parallel to its first leg and repeat the field seismic data collection process. The seismic source of the second shooting boat is fired at the same repetition rate as that of the source of the first shooting boat. In an alternate embodiment, a single shooting boat is utilized in conjunction with a separate recording boat. The seismic source aboard the shooting boat is fired at a repetitive time interval as the shooting boat traverses a zigzag course line substantially symmetrical to the base course line of the recording boat.

Throughout the collection process, the in-line velocities of the recording and shooting boats are maintained at substantially the same absolute values. In that way instantaneous positions of each of the hydrophones and the seismic sources along the oblique firing legs can be controlled as a function of the repetition firing rate of the seismic sources so as to define a true two-dimensional grid of center points betwen respective source point-hydrophone pairs as the seismic data is collected. After normal moveout correction has been completed, the separate signal outputs of the hydrophones previously recorded, can be referred to and associated with cross sets of center points aligned along imaginary lines perpendicular to the base course of the recording boat. These cross sets of traces can then be further processed, as by beam steering, to enhance the primary signal reflections in the original traces while suppressing random noise. Further, because at least one trace of each cross set of traces is also a product of a respective source-point-hydropnone pair having a sub-stantially different horizontal spacing than at least one other source point-hydrophone pair of the same cross set of traces, coherent noise, including multiple signals, is also suppressed as summation occurs. Further advantages that accrue in the use of the present invention include:

i. The problem of drifting of the hydrophone and/or source is reduced because the recording and shooting boats maintain a forward pull to offset the sideways drift force imparted by water and wind currents;

ii. The probability of getting locational traces associated with center points aligned perpendicular to the line of survey is enhanced because the recording boat and the flanking shooting boats move across the water at the same in-line velocity so that the same in-line position in the direction of movement of the exploration system can be maintained throughout the field collection process.

Other objects and advantages of the present invention will be made apparent from the following detailed description taken in conjunction with the following accompanying drawings in which.

Figure 1:
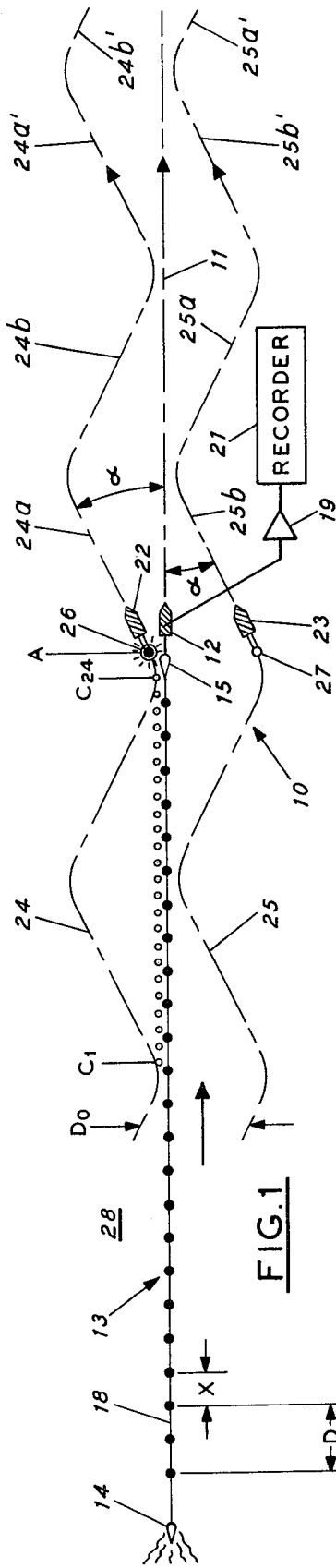
FIGS. 1, 2 and 3 illustrate, in plan view, a chronologically related sequence of the instantaneous positions of an array of shooting and recording boats for systematically producing a series of locational traces associated with individual center points between respective source point-hydrophone pairs at the instantaneous position shown.
Figure 2:
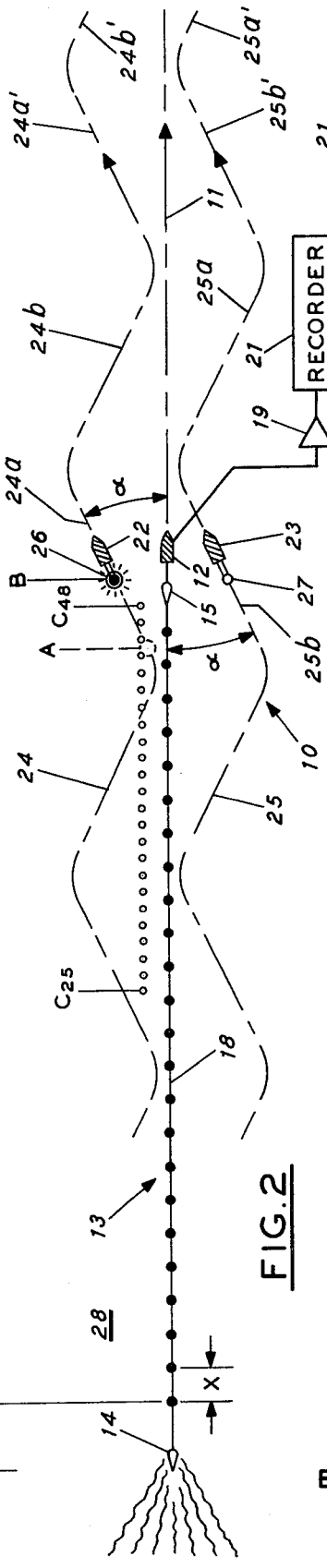
Figure 3:
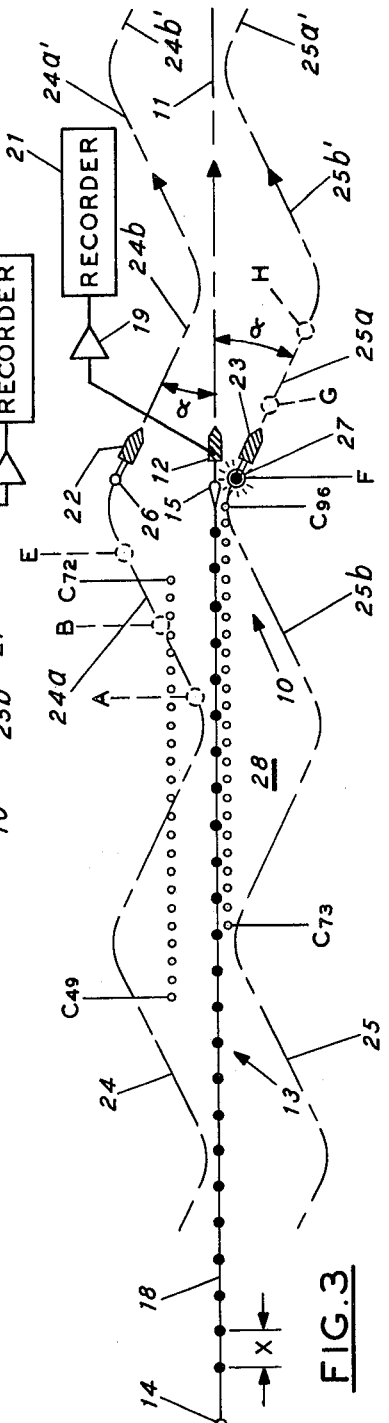
Figure 7:
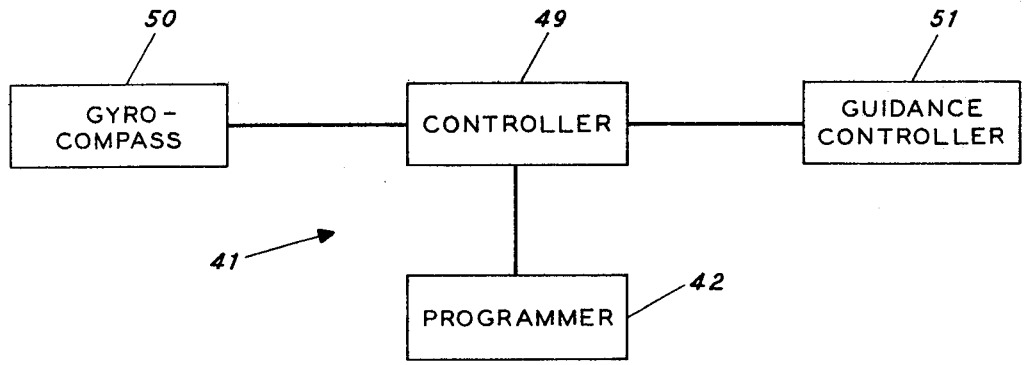
Figure 6:
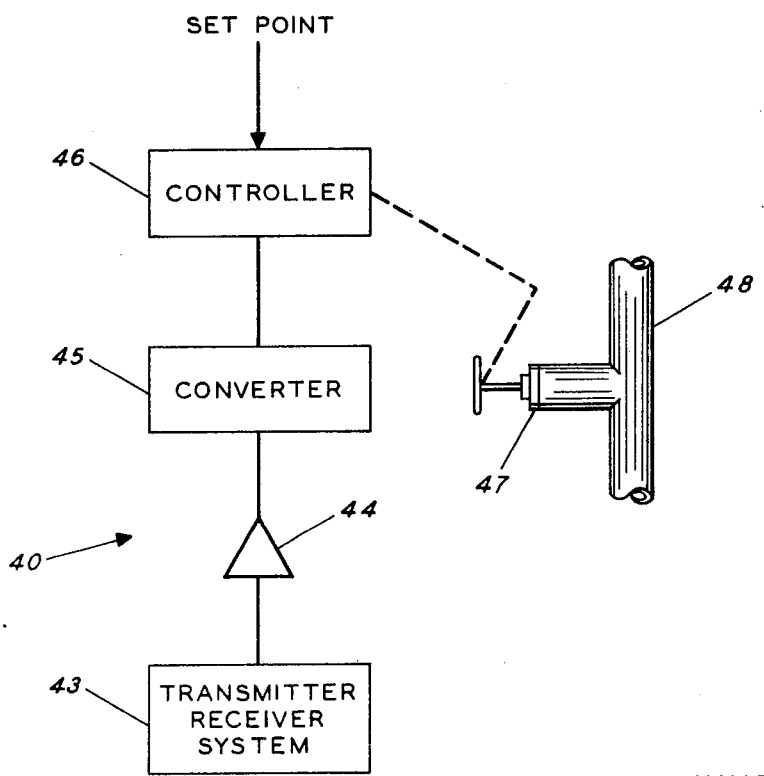
Figure 10:
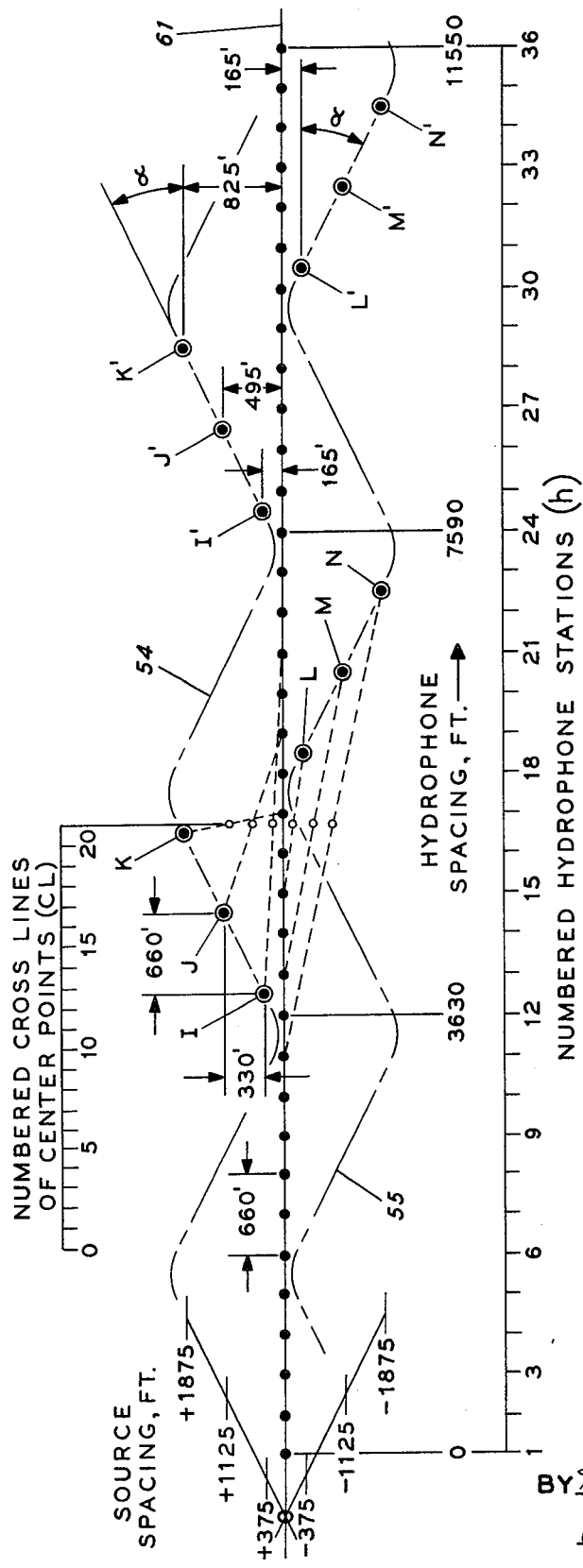
Figure 11:
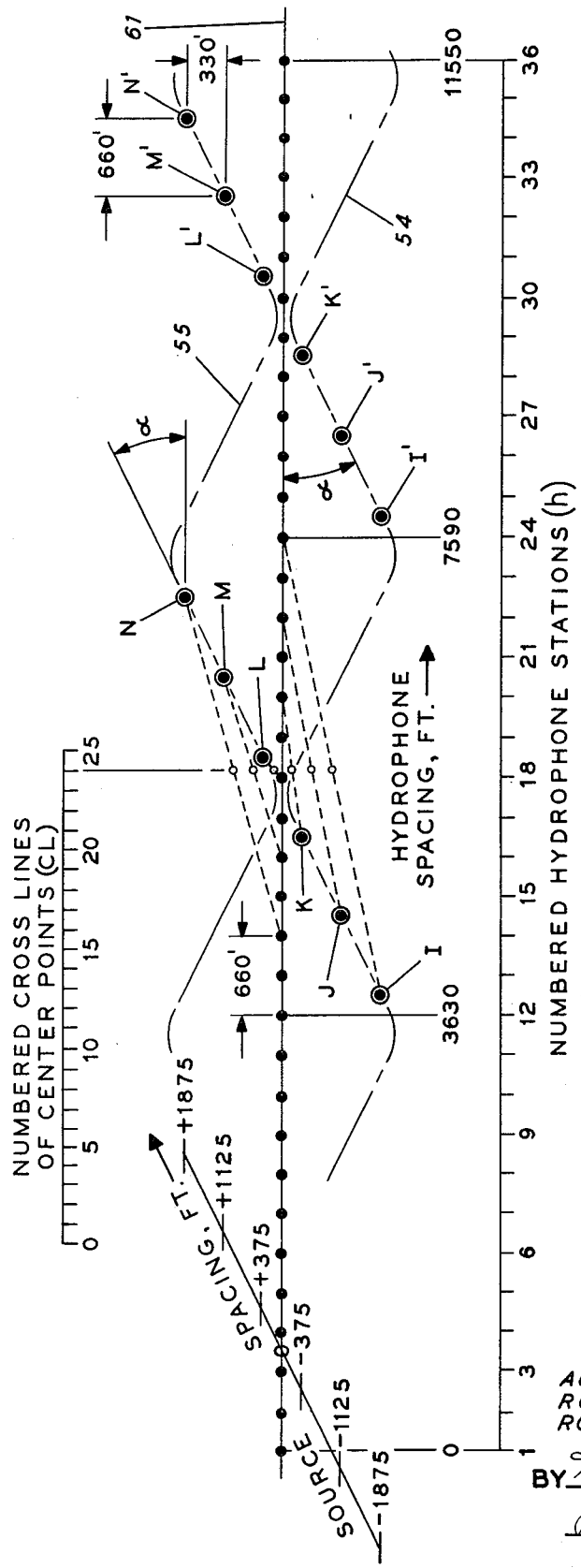
Figure 12:
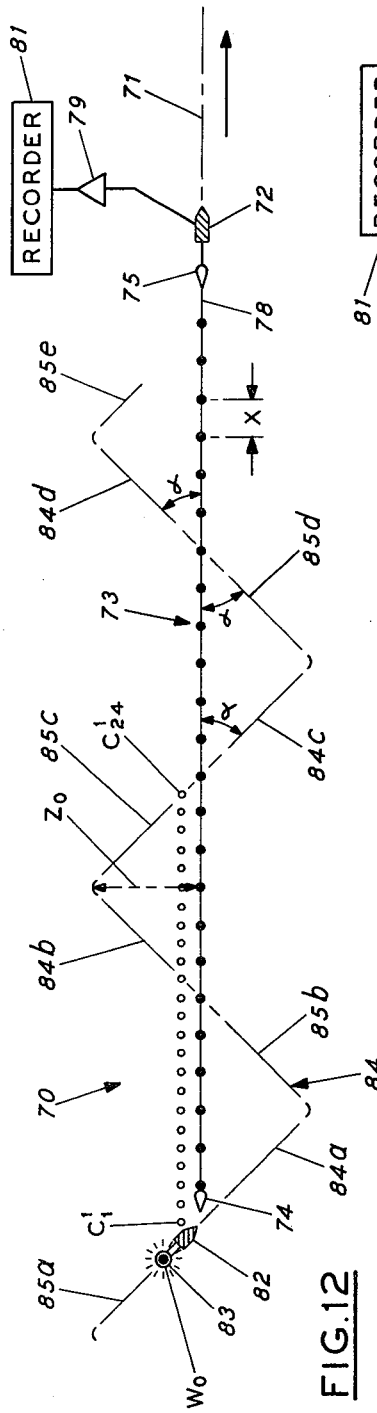
Figure 13:
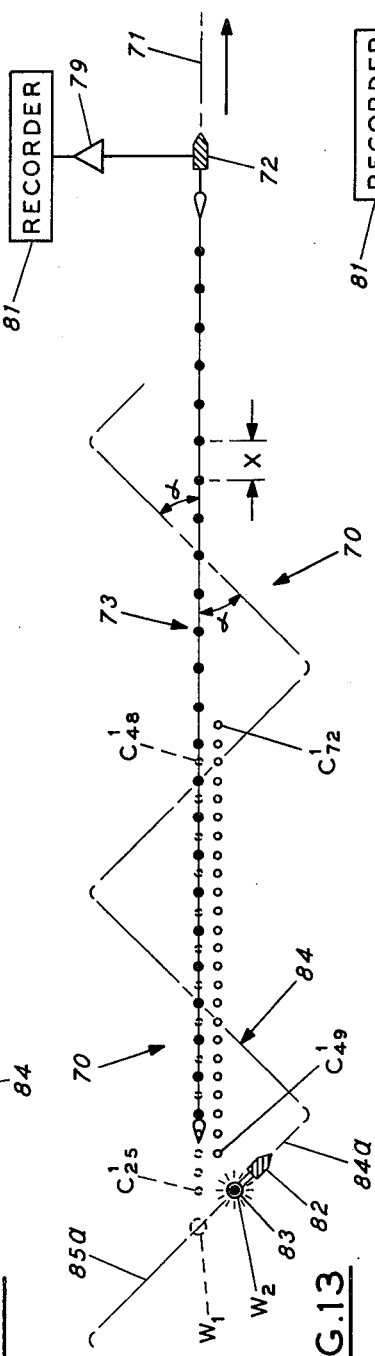
Figure 14:
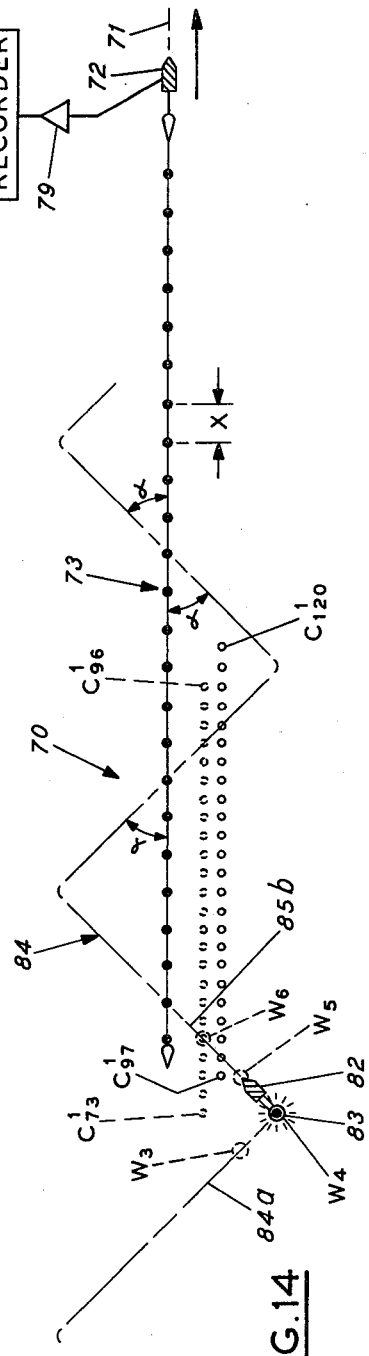

FIGS. 6 and 7 are block diagrams of navigational control equipment useful in carrying out the method of the present invention; in FIG. 6, a servo speed control system is illustrated for maintaining the shooting and recording boats of FIGS. 1, 2 and 3 at correct absolute velocities; in FIG. 7, a servo guidance control system is illustrated for maintaining programmed headings for each of the shooting and recording boats;

FIGS. 8 and 9 illustrate alternate positional deployment of shooting and recording boats for efficient collection of marine seismic data in accordance with the present invention;

FIGS. 10 and 11 are plots of the positions of the source points and hydrophone stations provided by the shooting and recording boats of FIGS. 8 and 9, respectively;

FIGS. 12, 13 and 14 illustrate, in plan view, a chronologically related sequence of instanteous positions of a single shooting boat and separate recording boat, the shooting boat traversing a zigzag course line substantially symmetrical to the hydrophone course line of the recording boat.

Referring now to FIG. 1, a marine seismic exploration system 10 is shown at one point, in time, along a base line of explorative traverse 11. The exploration system 10 includes a recording boat 12 behind which trails a hydropone spread 13 terminating at aft float-paravane assembly 14. Hydrophone spread 13 is coupled to the recording boat by float-paravane assembly 15 and comprises a series of hydrophones arranged along the base line 11 and connected by way of a separate conducting cable 18 to the input of a multichannel amplifier 19 located aboard the recording boat. A recorder 21 records separately each of the seismic signals detected at the hydrophones.

Shooting boats 22 and 23 are equipped with repetitive seismic sources 26 and 27, and these boats traverse zigzag course lines 24 and 25 flanking base course line 11 of the recording boat 12. As shown in detail in FIG. 1, the zigzag flanking course line 24 includes a series of oblique firing legs 24a, 24a', etc., extending away from the base line 11 at the included angle α and a series of return legs 24b, 24b', etc., extending toward the base line 11 at the same angle α. Firing legs 24a, 24a', etc., are separated by return legs 24b, 24b', etc., as shown. Similarly, the zigzag flanking course 25 includes a series of oblique firing legs 25a, 25a', etc., interspersed between oblique return legs 25b, 25b', etc. Firing legs 25a, 25a', etc., and return legs 25b, 25b', etc., are defined by the included angle α, as shown. Inasmuch as the geometry of the course lines 24 and 25 is the same, the firing and return legs of each course line are seen to be located in parallel alignment with opposite members of the other course line. For example, measuring with respect to base line 11, firing legs 24a, 24a', etc., of course line 24 are in parallel alignment with the return legs 25b, 25b', etc., of course line 25, and vice versa. Further, it is evident from FIG. 1 that the horizontal distance, $D_o$, between shooting boats 22 and 23 measured along an imaginary line substantially perpendicular to base line 11 remains a constant value during the collection process.

In operations, the seismic sources 26 and 27 are energized at different times during the process. Shooting boat 22 traverses zigzag course line 24, as shooting boat 23 traverses the course line 25. One of the seismic sources is sequentially energized when positioned at selected locations along the firing leg of its zigzag course line, while the other source is positioned along selected locations of the return legs of its zigzag course line.

The locations of the source points provided by the sequential firing of the seismic sources are coordinated with the instantaneous locations of the hydrophones constituting hydrophone spread 13 in the following manner: In FIG. 1, shooting boat 22 is seen as traversing the firing leg 24a of zigzag course line 24, while shooting boat 23 is seen as traversing along return leg 25b of zigzag course line 25. As shown, the shooting boats 22 and 23 flank the recording boat 12 and all lie along an imaginary line substantially perpendicular to the base line 11. When the shooting boat 22 reaches a point where the seismic source 26 is placed at source point A, seismic source 26 is energized creating a downwardly directed three-dimensional wave front of acoustic energy. The energy is transmitted through the layer below water surface 28 to reflecting discontinuities which, for purposes of description of one embodiment of the present invention, are assumed to lie along a flat reflecting horizon below water surface 28. The acoustic energy from the seismic source 26 is assumed to be reflected from the horizon along straight-line ray paths. The signals are conducted by conducting cable 18 to multichannel amplifier 19 and then recorded separately by recorder 21. At the instant when the seismic source 26 is located at source point A and fired, a series of center points $C_1$–$C_{24}$ located between the position of the hydrophone spread as the data is collected and the source point A, is formed. Each center point $C_1$, $C_2$, $C_3$, etc., is midway along an imaginary line drawn between the source point A and the instantaneous position of its respective hydrophone of hydrophone spread 13 as the data is collected.

Referring now to FIG. 2, there is shown the marine seismic exploration system 10 of the present invention at another point in time along base line 11 and course lines 24 and 25. In the Figure, the shooting boat 22 has moved along firing leg 24a at a velocity V' equal to $$V/\cos \alpha$$

Where V is the velocity of the recording boat 12 along base line 11 and $\alpha$ is the included angle between the base line 11 and the firing leg 24a. Simultaneously, the recording boat 12 has moved a distance D from its previous receiving position, distance D being equal to twice the spacing interval $(x)$ between individual hydrophones constituting the hydrophone spread 13. Shooting boat 23 has continued along return leg 25b an equivalent in-line distance to remain in a flanking position. When the source 26 is positioned at new source point B of firing leg 24a, as shown, the source is energized to generate another downwardly directed seismic wave front through the layer below water surface 28. Energy is again reflected to the hydrophone spread and, after being amplified by amplifier 19, is recorded separately by recorder 21.

As the seismic data is collected, the instantaneous positions of the seismic source 26 at source point B with respect to the instantaneous positions of the individual hydrophones, create a new group of center points $C_{25}$–$C_{48}$ parallel to but offset from the previously indicated center points $C_1$–$C_{24}$ of FIG. 1.

Each field record tape produced by recorder 21 is identified with both the seismic source point where the energy originates, such as source points A, B, etc., and the locations of the hydrophones receiving the reflected energy. Assuming the hydrophone spread contains 24 hydrophones, two field records of 24 locational traces each are thus produced by the hydrophones and by the separately fired sources at source points A and B. In producing each field tape, the recording boat is moved forward an incremental distance (between shots) equal to twice the in-line spacing interval between hydrophones between the incremental firing of the source.

In order to maintain center points $C_1$, $C_2$, $C_3$...$C_n$, where $n$ is any cardinal integer, in correct alignment as the recording and shooting boats move, in-line distances moved by the shot and recording boats between shots during collection of the seismic data should be equal and remain constant during the collection process. Since the recording boat moves twice the hydrophone spacing interval X between the firing of shots at adjacent source points, the in-line velocity of both boats as well as the repetition timing interval T between seismic shots can be directly related to the hydrophone spacing interval X in accordance with the following equation:

$$2X = V_o T$$

where X is the spacing interval between adjacent hydrophones, $V_o$ is the in-line velocity of the boats parallel to base line 11 and T is the constant repetitive firing interval of the seismic source along the firing leg 24a. By maintaining the in-line velocity of the shot and recording boats at equal absolute values, the field procedure can be carried out in a manner in which the recording and shot boats remain in the same relative flanking positions throughout the field collecting process even though offset distances vary between respective boats.

In FIG. 3, the system 10 is shown at yet another instant in time during the field collection process. As shown, shooting boat 22 has completed its traverse of firing leg 24a and has changed heading to place the boat along return leg 24b. Its source 26 has been placed in an inactive state, but previous to that condition, the source 26 had been located at source point E and fired, causing reflection signals to be received at the hydrophones of hydrophone spread 13. These signals, after amplification, were recorded by recorder 21. Center points $C_{49}$–$C_{72}$ identify the instantaneous positions of the hydrophones with respect to source point E as the seismic data was collected.

As shown in FIG. 3, shooting boat 23 has begun a firing traverse along firing leg 25a of course line 25 at a velocity V' equal to $$V/\cos \alpha$$

where V and $\alpha$ are as previously defined. After the shooting boat 23 has placed seismic source 27 at source point F, the source is fired and reflection signals are received at the hydrophone spread and recorded at recorder 21. The instantaneous positions of the hydrophones as the data is collected are indicated with reference to center points $C_{73}$–$C_{96}$ positioned at locations offset from base line 11 on an opposite side of the previously mentioned center points $C_{49}$–$C_{72}$ at mid locations between the source point F and the hydrophones. As the shooting boat 23 continues along firing leg 25a, the source 27 will be placed and fired at new source points G and H shown in phantom line in the Figure. The instantaneous midpoint positions of the hydrophone spread with respect to these new source points G and H, as the seismic data is collected, respectively, will be indicated by two new lines of center points (not shown) parallel but offset from the previously formed center point line $C_{73}$–$C_{96}$ of FIG. 3.

Figure 4:
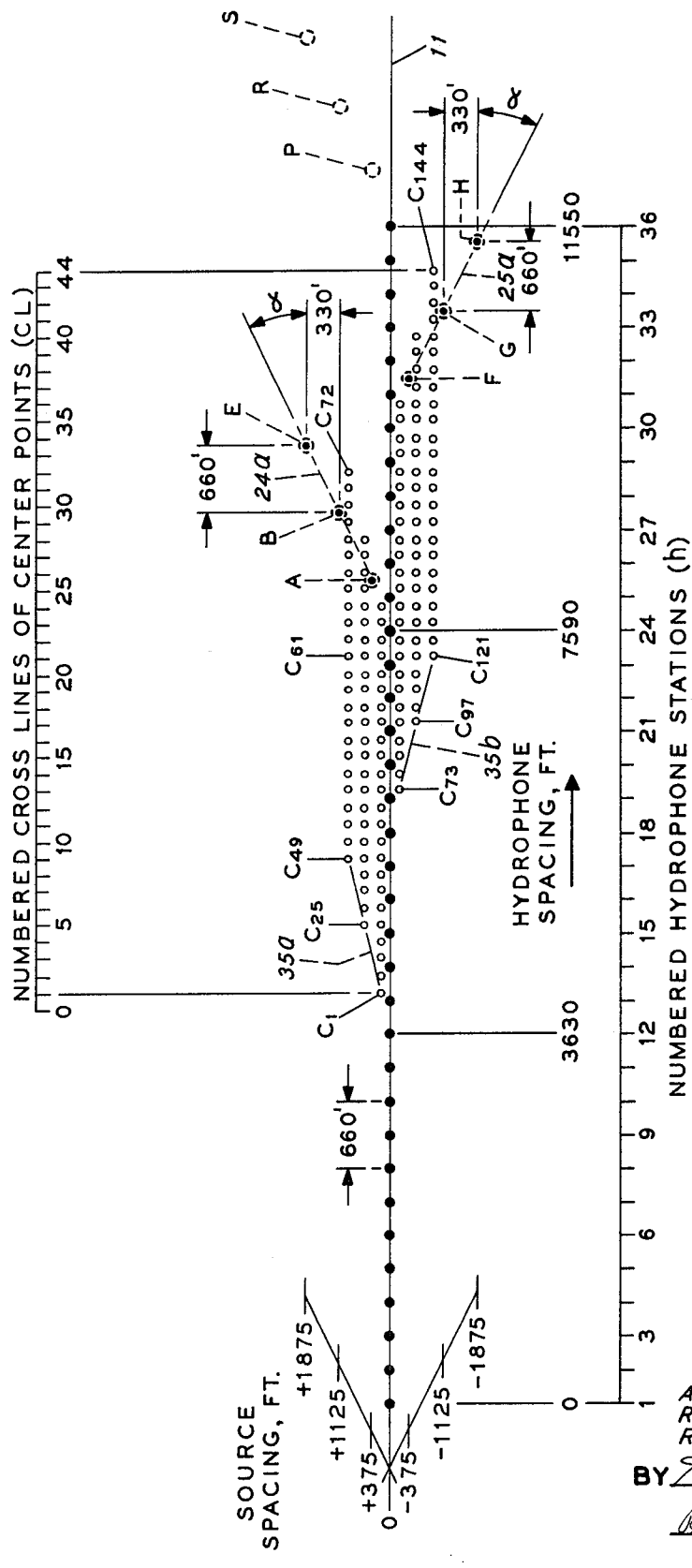
FIG. 4 is a plot of the position of a grid of center points related to the instantaneous position of the array of shooting and recording boats of FIGS. 1, 2 and 3, the individual center points being related to the locational traces and comprising cross sets of center points perpendicular to the base course line of the recording boat.

FIG. 4 illustrates a composite two-dimensional grid of center points produced by the method of FIGS. 1–3. In FIG. 4, the center point grid pattern is plotted as a function of hydrophone-source locations illustrated in FIGS. 1–3, using an actual field exploration system of the following dimensions:

| Item | Dimension |
|---|---|
| Source Points | |
| Oblique Offset Spacing | 750' |
| In-Line Spacing Component | 660' |
| Cross Spacing Component | 330' |
| Angle of Inclusion, between firing and return legs with respect to the base line, $\alpha$ | 26½° |
| Center Points | |
| In-Line Spacing | 165' |
| Cross Spacing | 165' |
| Total Cross Offset Length (e.g., between points $C_{81}$–$C_{121}$) | 825' |
| Geophone Stations | |
| In-line Spacing | 330' |

In FIG. 4, the recording and shot boats have traversed a two-dimensional surface area in a manner previously described; the resulting series of hydrophone stations $h_1$, $h_2$...$h_{36}$ indicate the instantaneous positions of the hydrophone spread as the seismic data was sequentially collected. Typical interval spacing between the hydrophone stations $h_1$, $h_2$...$h_{36}$ is indicated, in feet, across the bottom of the Figure. The positional relationship of a series of source points A, B, E, F, G and H along oblique firing segments 24a and 25a with hydrophone $h_1$, $h_2$...$h_{36}$ is also indicated. Typical oblique spacing between the source points is indicated, in feet, along the left-hand side of the Figure. After a source has been fixed, in sequence, at points A, B, E, F...H, signals are received at the hydrophone stations $h_1$, $h_2$...$h_{36}$ and recorded as locational traces.

Variation in instantaneous positions of the spread and sources as the data is collected, is seen to form cross sets of center points aligned along imaginary lines perpendicular to base course line 11. The positions of the transversely aligned sets of center points with respect to source point-hydrophone station locations, are indicated across the top of the Figure. As indicated, the buildup of cross sets of center points associated with cross lines $CL_1$, $CL_2$...$CL_{36}$ is along oblique lines 35a and 35b at the left-hand side of the plot linking center points $C_1$, $C_{25}$, $C_{49}$ and center points $C_{73}$, $C_{97}$, and $C_{121}$, respectively. Accordingly, it is not until the locational traces associated with the center points of cross line $CL_{21}$ have been produced that a full complement of six locational traces for each cross set of center points is achieved.

Thereafter, the full complement of locational traces (i.e., six locational traces per each cross line of center points) is maintained as the collection process proceeds from left to right as viewed in FIG. 4. For example, sources positioned and fired, in sequence, at source points P, R and S of FIG. 4 will generate seismic energy which, when reflected, at depth, can be received, in sequence, by hydrophones positioned at a series of hydrophone stations positioned along base line 11. Because the variation in position of the source points P, R and S with respect to the locations of the hydrophone stations is in the same manner as that previously described with respect to source points A, B and E and hydrophone station groups $h_1$...$h_{24}$, $h_3$...$h_{26}$, and $h_5$...$h_{28}$, the result array of center points are aligned in individually correct offset and in-line locations to continue to locate the center points in sets of center points aligned along lines perpendicular to the base line 11, i.e., along cross lines $CL_{25}$, $CL_{26}$, $CL_{27}$, etc., of FIG. 4.

Spacings between the adjacent source points along each firing course line ("oblique source point interval") are incrementally constant but increase in absolute values in cross directions away from the base line 11. It is also evident that the two sets of three adjacent source points beginning at source point A (i.e., source points A, B and E and source points F, G and H) are located along the two oblique firing lines 24a and 25a of FIG. 4 diverging from the base line 11 in opposite directions in the direction of movement of the boats. Also, when the firing lines are extended to intersect the base line, each two succeeding firing lines of like slope define two points of intersection along the base line 11, the midpoints therebetween being coincident with the point of intersection of an oppositely sloped firing line.

The cross component ($y$) of a line coincident with the firing legs 24a or 25a relates to its in-line component ($x$) and the cross and in-line values of the spacings of the center points of FIG. 4 in accordance with the general equation:

$$y = 2(md/ng)\,x$$

where $d$ is the offset (cross) spacing of adjacent center points, $g$ is the in-line spacing of adjacent center points, $n$ is an integer identifying the hydrophone station and $m$ is an integer identifying the midpoint between a respective source point-hydrophone pair. The angle of inclusion $\alpha$ of each line of source points is similarly related to both the in-line spacing and the cross spacing of the center points by:

$$\alpha = \tan^{-1}(2d/g)$$

Further, where symmetry of adjacent center points is desired, the angle of intersection $\alpha$ of the firing legs 24a, 25a, etc., should be about 26½° while the cross component of the spacing of adjacent source points should be about equal to ($i$) the magnitude of the spacing interval $x$ between adjacent hydrophones and ($ii$) about one-half the in-line component of the oblique spacing interval of the source points, as shown.

In this application, where the center point density is said to be uniform, it is meant that at least the in-line spacing between adjacent center point locations is constant. If the offset spacing between adjacent center point locations is equal to the in-line spacing, the center point density is referred to as being symmetrical.

It is convenient in the initial investigation of the information contained in the locational traces to think of each trace as representing energy reflected from a depth point of a hypothetical flat horizon. Assuming straight-line ray paths, the energy is therefore reflected from a depth point directly below a particular center point $C_1$-$C_{144}$ of FIG. 4. Thus, when normal moveout and static corrections are applied to the traces, each trace can then be thought of as if it has been recorded by a particular source-hydrophone pair which were alternately positioned at the same center point directly above a reflection point indicated in the trace. Normal moveout and static correction of the traces can be introduced by several methods well known in the seismic art; one manner for introducing normal moveout corrections is shown in U.S. Pat. No. 2,838,743 of O. A. Fredriksson for "Normal Moveout Correction with Common Drive for Recording Medium and Recorder and/or Reproducing Means". It should be understood that where there is a dipping subsurface bed and/or where variations in the velocity of the transmission of the seismic energy with depth occur, the depth points indicated on the traces will not be vertically aligned below the center points of the grid indicated in FIG. 4. However, for working convenience in the preliminary steps of processing of the seismic data in the present invention, the corrected locational traces are treated as though they were representative of reflection point locations immediately below the center points of FIG. 4.

Since each center point location of FIG. 4 can be said to be representative of a reflection point of a hypothetical flat horizon directly below that center point, it follows that each center point can be thought of and referred to in association with a locational trace. It is also evident that each locational trace may be referred to, reciprocally, in association with a particular horizontal hydrophone station-to-source point spacing identified with a particular center point location.

Figure 5:
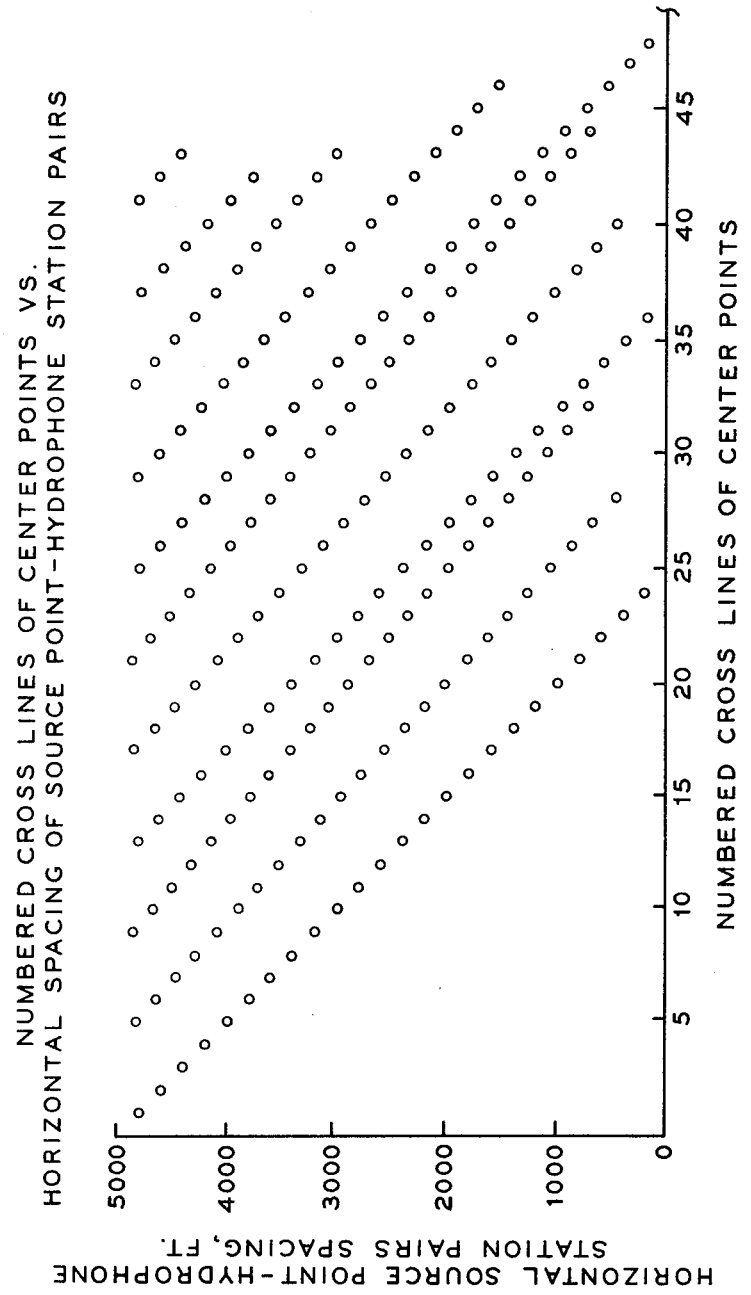
FIG. 5 is a plot of the horizontal source point-to-hydrophone spacing of the cross sets of center points of FIG. 4, illustrating how the horizontal spacing associated with the cross lines of center points varies in magnitude.

FIG. 5 is a plot of the hydrophone station-to-source point horizontal spacing associated with the cross sets of locational traces produced by the hydrophone station-source point array of FIG. 4. In this plot, the horizontal scale represents transversely aligned center points $CL_1$, $CL_2$...$CL_{48}$ while the vertical scale denotes the horizontal hydrophone station-to-source point spacing associated with each locational trace. The cross sets of transversely aligned traces are seen to have substantially different horizontal spacings. It must be understood that the present invention contemplates that after appropriate normal moveout of static correction has been applied, the sets of corrected traces will be grouped in association with cross lines of center points such as along $CL_{21}$, $CL_{22}$, etc. Further, the cross sets of traces will undergo group processing-enhancing procedures.

It is evident that the level of multiples, ghosts, reverberations, etc., in the traces associated with cross lines $CL_{21}$, $CL_{22}$, etc., after the original sets of traces have undergone group enhancing processing steps, such as beam steering, will be significantly attenuated. This is because the individual traces constituting the cross sets of traces are associated with cross sets of center points having substantial differences in horizontal spacing as previously mentioned.

It will also be appreciated by one having a knowledge of regrouping and enhancing processes such as described in the Judson et al application Ser. No. 787,788, previously mentioned, that if the locational traces, after normal moveout and static corrections have been applied, are regrouped into cross sets of locational traces )perpendicular (perpendicular the base line 11) and then beam steered by imposing suitable progressively related time delays among the cross sets of traces and then compositing the sets of traces, a new set of cross steered traces will be produced. Equipment and apparatus steps for performing these processing steps are described in detail in the aforementioned Judson et al application. After the sets of locational traces are beam steered, this new set of cross steered traces will contain directional information associated with the reception of siesmic energy from different individual directions relative to a vertical plane coincident with base line 11 of FIG. 4. The cross steered traces may be displayed by side-by-side placement of the traces having a common cross moveout but related to different in-line positions along the base line 11, FIG. 4. In this manner, each record represents traces having a common angle of emergence, but each trace also represents an individual in-line position along the base line 11. Each trace of the cross directional record represents a composite of several traces of the original seismic data. It also represents seismic energy received from a particular cross direction denoted by the particular cross moveout assigned to the record. Accordingly, in the sets of records, each set having a different cross moveout can be analyzed to indicate which one of the records of the set displays a seismic event most strongly. In that way the cross moveout from that event has been identified. The in-line moveout can be determined in a similar manner using the record having a cross moveout which displays the event most strongly. The in-line moveout of the event can be determined merely by measuring the disparity in arrival time of the chosen event between the left- and right-hand traces of that record.

The cross sets of traces are associated with cross lines of center points whose maximum total cross offset lengths, say between points $C_{61}$ and $C_{121}$ of FIG. 4, are based upon consideration of several factors, among which are: (1) each cross set of traces should not contain signals which have been reflected from a stratum having excessive curvature (an excessively curved stratum is a stratum whose associated reflected seismic signals upon recordation and processing, by beam steering, are prevented from having meaningful in-phase summation); and (2) each cross set of traces can contain signals having similar but different moveouts, but such signals capable of being distinguished using beam steering processing techniques in accordance with the present invention.

For determining the location of sharply curved flanks of salt domes, for example, it can be very helpful to use arrays whose maximum total cross offset length of center points is rather short, say typically 300 feet. But for more gently curved beds, arrays can be used which provide much longer maximum total cross offset length of center points, say 3000 feet or more. Further, it may be desirable (even in the case of collecting data associated with gently curved strata) to use arrays which provide rather short maximum total cross offset length of center points, say a typical cross offset length well below 300 feet. In such cases, the economic advantage gained in the collecting and processing of the data has been found to offset any loss in directivity of events in the records.

FIGS. 6 and 7 are block diagrams of navigational control equipment useful in carrying out the method of the present invention. In FIG. 6, a servo speed control system 40 is illustrated for maintaining the shooting and recording boats at correct absolute speeds. In FIG. 7, a servo guidance control system 41 is illustrated for maintaining programmed headings for each of the shooting and recording boats.

In more detail, the servo speed control system 40 of FIG. 6 includes a doppler sonar navigational radar system for automatically and continuously computing the actual velocity of each boat. The doppler radar system employs continuously emitted sonic energy to determine the velocity of the shooting and recording boats by utilizing the principle known as the doppler effect. In still more detail, the velocity of a moving vessel is indicated by transmitting sonic waves from a transmitter-receiver unit 43 downward toward the water bottom in several azimuthal directions, receiving reflections of the sonic energy, and determining the change in frequency between the transmitted and reflected energy due to the doppler shift. As the energy is received at the transmitter-receiver unit 43, portions of the transmitted and reflected signals are mixed to produce sums and differences of the two mixed signals. The sum of the mixed signals as well as the input signals are shunted to ground through a capacitor at the transmitter-receiver unit. The resulting difference frequency signal is then coupled from the mixer to amplifier 44 and, after amplification, is coupled to data converter 45. In data converter 45 the center frequency of the input signal generates an analog voltage, such as a 400-cycle-per-second signal, proportional to the input signal. By comparing the generated voltage of converter 45 with a setpoint voltage at controller 46, there is provided a control signal for controlling the speed of the boat. For example, the control signal may operate valve 47 in the fuel line 48 whereby the increase or decrease of flow of fuel in that line either speeds up or slows down the boat.

In FIG. 7 the servo guidance control system 41 includes a controller unit 49. The actual direction of the boat is indicated by gyrocompass 50, which produces a control signal coupled to the controller 49. The signal of the gyrocompass is compared in the controller with the desired setpoint signal voltage of programmer 42. If a difference in voltage level occurs, the controller produces a control signal which is coupled to guidance controller 51 for changing the direction of the boat to a correct course heading. For example, the guidance controller may include a servo control system for mechanically moving the rudder in a direction which automatically brings about correction in the direction of the heading of the boat.

Modifications

Field collection techniques producing the center point grid pattern of FIG. 4 can be modified in accordance with the methods illustrated in FIGS. 8 and 9. In FIGS. 8 and 9, shooting boats 52 and 53 traverse flanking zigzag courses 54 and 55 relative to the base course 61 of the recording boat 62. However, instead of the shooting and recording boats flanking each other along a common line substantially perpendicular to the base line 61 (as described in FIGS. 1–4), only the shooting boats are placed in flanking positions. The recording boat 62 still traverses base course 61 in straight-line fashion, as previously described. But, as shown, the recording boat 62 remains substantially ahead of the instantaneous positions of the shooting boats 52 and 53, as the data is collected. The shooting boats themselves remain flanked along a line substantially perpendicular to the base line 61 at time-dependent positions relative to the midspan of the hydrophone spread 64. The relative velocities and courses taken by the shooting boats and recording boat remain substantially as described hereinbefore. The velocity $V'$ of the shooting boats along the zigzag course lines 54 and 55 remains equal to $$V/\cos \alpha$$

where $V$ is the velocity of the recording boat 62 and $\alpha$ is the included angle between course lines 54 and 55 with respect to base line 61, preferably equal to about 26 ½°.

In FIGS. 8 and 9, shooting boat 52 is seen at an instant in time during the collection process moving along firing leg 54a of zigzag course line 54. Other firing legs 54a', etc., as well as return legs 54b, 54b', etc., are shown in phantom line. Shooting boat 53 (with source 57 inactive) is seen moving in flanking alignment with shooting boat 52, along return leg 55b of course line 55 at a velocity $V'$. Other return legs 55b', etc., as well as firing legs 55a, 55a', etc., are shown in phantom. Recording boat 62 is seen traversing base line 61 at a velocity $V$ related to velocity $V'$ of the shooting boats in the aforementioned manner.

The repetitive source 56 of the shooting boat 52 is fired at source point I with the recording boat 62 and hydrophone spread 64 located as shown in FIGS. 8 and 9. The twenty-four member hydrophone spread 64 including forward float-paravane assembly 65 and aft float-paravane assembly 66 is shown with its midspan adjacent to the source point I. Reflections of the emitted energy are received at the hydrophones and, after amplification, recorded by recorder 70 aboard recording boat 62. In the manner previously mentioned, the trace of the field record tape produced by the recording and shooting boat arrays of FIGS. 8 and 9 is identified with a particular center point midway between the source point I and the instantaneous location of a hydrophone of the hydrophone spread 64 at the time the seismic data is collected. The center points associated with source point I will lie along a line parallel to the base line midway along the shortest line connecting source point I and base line 61.

As the collection proceeds from left to right, as viewed, additional field tapes are provided. Between recordings, the hydrophone spread 64 is advanced along the base line 61 a distance equal to the in-line spacing between the last-used source point (source point I) and the adjacent source point to be next used (source point J). The seismic source 56 is advanced in tandem with movement of the hydrophone spread 64. When source 56 is positioned at source point J, for example, and activated, there are produced reflection signals at the hydrophone which, after amplification, will be recorded to provide a field record of locational traces identified with center points substantially parallel to the base line 61, but offset from the first line of center points associated with source point I and the instantaneous position of the hydrophone spread 64. However, a substantial number of these locational traces are associated with particular source point-hydrophone station positions such that a substantial number of the center points are located in cross alignment with center points of the first-produced line. The process is then repeated as the sources are located at remaining source points K, L, M and N, shown in phantom line, along the indicated firing legs of the course lines 54 and 55.

It is evident that the course lines 54 and 55 of FIG. 8 are similar in orientation to those illustrated and discussed in relation to FIGS. 1-3 while the same course lines in FIG. 9 have mirror symmetry about the base line. As shown in FIG. 8, course line 54 includes oblique firing legs 54a, 54a', etc., extending away from base line 61 at an included angle $\alpha$ preferably equal to about 26 ½°, and a series of return legs 54b, 54b', etc., extending toward the base line between the firing legs. Similarly, the zigzag course line 55 includes a similarly oriented series of firing legs 55a, 55a', etc., interspaced between oblique return legs 55b, 55b', etc., defining included angle $\alpha$, as shown. It is evident from FIG. 8 that the horizontal distance, $D_1$, between shooting boats 52 and 53 remains a constant value during the collection process. When one of the shooting boats is closing toward the base line 61, the other shooting boat, although having a parallel heading, is moving away from the base line at a speed equal to that of the closing shooting boat. However, as seen in FIG. 9, the opposite is true. When one of the shooting boats is closing towards the base line 61, the other shooting boat is also closing towards the base line at the same speed as the first shooting boat. As a result, during collection procedures, the horizontal distance between the shooting boats varies cyclically from a maximum value, say $D_2$, determined when both shooting boats are farthest from the base line to a minimum value, $D_3$, when the boats are closest to the base line. It is also evident in FIG. 9 that the six adjacent source points beginning with source point I through source point N lie along a common oblique line coincident with the firing legs 54a and 55a of the course lines 54 and 55.

Traces of each field record tape produced by the recording and shooting boat arrays of FIGS. 8 and 9 are identified with both the instantaneous position of the seismic source (at the time the energy is released) such as source points I, J... N, and the instantaneous location of the hydrophone spread 64 at the time the seismic data is collected. Accordingly, a total of six records comprising 24 locational traces each are thus produced by the shooting and recording boat array for the source points I, J...N as illustrated in FIGS. 8 and 9. Each trace is identified with a particular source point-hydrophone pair position as the sources are separately fired at source points I, J, K, L, M and N, as the shooting and recording boats move forward equal incremental distances between shots at least equal to twice the in-line spacing interval between the hydrophones. In this manner, a substantial number of locational traces can be associated with cross sets of center points that are aligned along imaginary lines perpendicular to the base line 61. Further, each of the cross sets of traces are associated with center points having substantial horizontal incremental spacing factors such that later processing, as by beam steering, produces enhanced traces in which coherent noise is significantly suppressed.

FIGS. 10 and 11 are composite plots of the instantaneous locations produced by the source point-hydrophone pairs of the arrays of FIGS. 8 and 9, respectively.

In FIG. 10, the instantaneous positions of the hydrophone spread 64 of FIG. 8 are illustrated as a series of hydrophone stations $h_1, h_2...h_{36}$. Typical interval spacing between the hydrophone stations is indicated, in feet, across the bottom of the Figure. The positional relationship of the series of source points I, J...N' as the data is collected is also indicated by the scale along the left-hand side of the Figure. The positions of the center points associated with the array of FIG. 8 as the data is collected are indicated with reference to the cross line designations $CL_1, CL_2...CL_2$ located at the top of the Figure. As shown, the in-line and cross spacing of the center points are constant and equal to about one-half the distance between adjacent hydrophone stations. The in-line spacing and alignment of the center points is indicated with reference to the horizontal spacing between the cross lines $CL_1, CL_2...CL_{21}$ of the Figure. Cross spacing of the center points is indicated by examining a typical set of center points located along cross line $CL_{21}$; as shown, the set of center points of $CL_{21}$ have a cross component of spacing equal to the in-line spacing of the center points.

Each source point I, J...N' has a common constant spacing interval relative to neighboring source points, the cross offset component of which is equal to (i) about the magnitude of the spacing interval between adjacent hydrophone stations and (ii) about one-half the in-line component of the oblique spacing interval between adjacent source points.

The terminal source points of each group of source points, i.e., source points K and N and K' and N', are seen to be positioned along firing legs of course lines 54 and 55. Cross offset distances separating the terminal source points with respect to the base line 61 are also seen to be equal to each other. Thus, the grid of center points between all possible source point-hydrophone station pairs is centered about the base line 61. However, as illustrated by the set of center points of $CL_{21}$, at least one locational trace of each cross set of traces of the cross lines $CL_{11}, CL_{12}...CL_{21}$ must be a product of a respective source point-hydrophone station pair having a substantially different horizontal spacing than at least one other source point-hydrophone station pair in the same cross set of traces. With respect to the traces associated with cross line $CL_{21}$, the horizontal spacing factor (the horizontal spacing factor is equal to the maximum horizontal spacing between a source-station pair minus the minimum horizontal spacing of a source-station pair of the same cross set of traces) is equal to about 3,125 feet using the scale of FIG. 10 (9/32 inch = 330 feet). That is to say, the horizontal spacing between source point N and hydro-phone station 11 is about 3,950 feet; the spacing between source point K and hydrophone station 17 is about 825 feet; and the horizontal spacing factor is 3,125 feet.

It is also evident from the typical set of cross center points of cross line $CL_{21}$ that the locational traces collected by the shooting boat-recording array of FIGS. 8 and 9 must be rearranged (regrouped) into cross sets of locational traces. A schedule by which locational traces are regrouped is indicated by the dotted lines of FIG. 10 drawn between the various instantaneous positions of the hydrophone station-source point pairs associated with center points of $CL_{21}$.

In FIG. 11, the instantaneous positions of the hydrophone spread 64 of FIG. 9 are also indicated at instantaneous stations $h_1$, $h_2...h_{36}$ having interval spacing as indicated across the bottom of the Figure. The positional relationship of the series of source points I, J...N' is indicated along the left-hand side of the Figure. The positions of the center points associated with the array of FIG. 9 as the data is collected are indicated with reference to the cross line designations $CL_1$, $CL_2...CL_{25}$ located at the top of the Figure. As shown, the in-line and cross spacing of the center points are also constant and equal to about one-half the distance between adjacent hydrophone stations. A typical set of center points associated with cross line $CL_{24}$ are also illustrated in detail.

As previously mentioned, the dotted lines intersecting the center points of $CL_{24}$ also indicate the regrouping schedule of the field tapes. It also indicates the horizontal spacing factor associated with the center points of $CL_{24}$. For example, the horizontal spacing between source point I and hydrophone station 24 is about 3,950 feet using a scale (9/32 inch = 330 feet) in FIG. 11, while the horizontal spacing between source point L and hydrophone station 18 is about 250 feet. Accordingly, the horizontal spacing factor for the typical set of center points of center line $CL_{24}$ is about 3,700 feet. Further, the terminal source point of each group of source points, i.e., points I and N, and I' and N', are seen to be positioned along the oblique firing legs of the course lines 54 and 55 and have equal offset distances with respect to the base line 61. Thus the grid of center points between all possible source point-hydrophone station pairs is centered about base line 61.

While certain preferred embodiments of the invention have been specifically disclosed, it should be understood that many variations will be readily apparent to those skilled in the art. For example, an additional servo control system can be utilized to continuously determine the relative positions of the shooting boats 52 and 53 of FIGS. 8 and 9 relative to the recording boat 62. It is contemplated that the servo control system will also initiate correcting functions to reposition the shooting boat. In such a system, separate r.f. beacons of different frequencies are placed aboard the recording boat 62 and at the aft float-paravane assembly 66. By means of a radar system aboard the shooting boats, the r.f. beacons could be interrogated and the distance from each shooting boat relative to the recording boat and the aft float-paravane assembly determined. Further, since the distance from the recording boat to the aft float-paravane assembly 66 is known, resolving circuits utilizing triangulation techniques can determine the instantaneous position of each shooting boat relative to the recording boat. Additional input signals related to the actual heading of the shooting boat vis-a-vis the recording boat and the respective absolute velocities of each, can also be utilized in the resolving circuits to provide other set point signal levels. As variation from set point occurs, control signals from the resolving circuits can be used to activate control circuits to vary the heading and speed of the shooting boats to correctly reposition the boats.

FURTHER MODIFICATIONS

The marine seismic exploration system shown in FIGS. 1, 2 and 3 can be further modified in accordance with the method illustrated in FIGS. 12, 13 and 14.

Referring now to FIG. 12, the modified seismic exploration system 70 is shown at one point, in time, along the base line of traverse 71. A recording boat 72 is seen to trail a hydrophone spread 73 therebehind, said spread 73 terminating at a float-paravane assembly 74. Hydrophone spread 73 is coupled to the recording boat at float-paravane assembly 75 and comprises a series of hydrophones arranged along the base line 71 and connected by way of separating conducting cable 78 to the input of multichannel amplifier 79 located aboard the recording boat. Recorder 81 records separately the seismic signals detected at each of the hydrophones.

Shooting boat 82 is equipped with a repetitive seismic source 83 and traverses a zigzag course line 84 symmetrically disposed about the base line 71 of the recording boat 72. As shown in detail in FIG. 12, zigzag course line 84 defines an imaginary envelope which passes through the maximum offset points of intersection of diverging legs 84a, 84b, 84c and 84d with converging legs 85b, 85c, 85d and 85e, respectively. As indicated in FIG. 12, the terms "diverging and converging" refer to the direction of the zigzag course line 84 measured in the direction of travel of the recording bout 72. The imaginary envelope through the maximum offset points of the diverging and converging legs seem to have a substantially constant amplitude $Z_o$ measured from the base line 71. Inasmuch as the zigzag course line 84 is symmetrically positioned about base course line 71, converging legs 85a, 85b, 85c and 85d are seen to merge, at base line 71, into diverging legs 84a, 84b, 84c, and 84d, respectively. At the maximum offset points of the zigzag line 84, the reverse is true.

In operations, the seismic source 83 is energized at a constant repetitive time interval (T) during the collection process. Shooting boat 72 traverses the zigzag course line 84 as the recording boat 72 traverses along base line 71. When the seismic source 83 is positioned at selected locations along the zigzag course line, it is energized in sequence. The locations of the source points provided by the sequential firing of the seismic source 83 are coordinated with the instantaneous locations of the hydrophones constituting hydrophone spread 73 in the following manner.

In FIG. 12, shooting boat 72 is seen to be positioned at a flanking position to the base line 71 behind the aft paravane assembly 74. When the shooting boat reaches a point where the seismic source is placed at seismic point $W_o$, seismic source 83 is energized creating a downwardly direction three dimensional wave front of acoustic energy. As previously described, the energy is eventually reflected upwardly to the hydrophone spread where detection occurs. The seismic source 83 located at source point $W_o$ and the instantaneous position of the hydrophone spread 73, thus define a series of centerpoints $C_1' - C_{24}'$. As previously indicated, these centerpoints are located between the instantaneous location of individual hydrophones of hydrophone spread 73 and the source point $W_o$. Each centerpoint is midway along an imaginary straight line drawn individual the source point $W_o$ and the ndividual instantaneous position of respective hydrophones of the hydrophone spread.

Referring now to FIG. 13, there is shown the marine seismic exploration system 70 at another point in time along base line 71 and zigzag course line 84. In the FIGURE, the shooting boat 82 has moved from converging leg 85a and across the base line 71 onto diverging leg 84a at a velocity V' equal to $$V/\cos \alpha$$

where V is the velocity of the recording boat 72 along base line 71 and $\alpha$ is the angle between the base line 71 and the converging and diverging legs of the zigzag course line 84. As shown, the seismic source 83 is positioned at source point $W_2$ and is fired to create the aforementioned three dimensional seismic wave front. Thereafter, signals reflected from subterranean discontinuities are received at the hydrophone spread 73 and recorded at recorder 81. These reflection signals are identified with centerpoints $C_{49}' - C_{72}'$ parallel to that offset from the centerpoints $C_1' - C_{24}'$ of FIG. 12. Previous to that condition, the source 83 had been located at source point $W_1$ on base line 71 and fired creating the aforementioned seismic wave. The reflection signals eventually received at the hydrophone spread 73, amplified of amplifier 79 and recorded at recorder 81, are identified with centerpoints $C_{25}' - C_{48}'$ parallel to but offset from the centerpoints previously described.

Each field record produced by recorder 81 is identified with both the seismic source points such as source points $W_0, W_1 \ldots W_n$ where $n$ is any cardinal integer, and the instantaneous locations of the hydrophone spread 73 as the signals are received. In producing each field record, the recording boat 72 is moved forward an incremental distance (between shots) equal to the in-line spacing interval X between hydrophones.

In FIG. 14, the modified system 70 is shown at yet another instant in time during the field collection process. As shown, shooting boat 82 has completed its traverse of diverging leg 84a and has changed heading to place the boat along converging leg 85b whereby the seismic source 83 is positioned at source point $W_4$. Previous to the condition illustrated, the source 83 had been located at source point $W_3$ on diverging leg 84a and fired creating a seismic wave, resulting eventually in reflection signals received at hydrophones which, after amplication by amplifier 79, are recorded by recorder 81. Center points $C_{73}' - C_{96}'$ identify the instantaneous positions of the hydrophones with respect to source $W_3$.

As shown in FIG. 14, the shooting boat 83 has now begun a firing traverse along converging leg 85b at a velocity $V' = V/\cos \alpha$ where V and $\alpha$ are as previously defined. When the shooting boat is positioned at source $W_4$, the source is fired. Reflection signals are received at the hydrophone spread and eventually recorded by recorder 81. The instantaneous positions of the hydrophones, as the data is collected, are indicated with respect to center points $C_{97}' - C_{120}'$ parallel to the previously described center points. As the shooting boat continues along converging leg 85b, the source 83 will be placed and fired at new source points $W_5$ and $W_6$ shown in phantom line, to repeat the process.

It is apparent when the source 83 is consequently positioned the source points $W_5$ and $W_6$, along converging leg 85b, that the resulting center points will be coincident with a majority of the center points $C_{73}' - C_{96}'$ previously generated. Thus, digital data processing techniques based, primarily, on combining locational traces related to coincident reflection zones, can be used, if desired. Enhancement of the locational traces identified with common in-line center points is thus facilitated. Further, it may be desirable, in some field applications, either to increase the length of the hydrophone spread 73, say up to 48-individual hydrophones per spread, or to utilize, in tandom, two loading boats each towing a 24-individual hydrophone spread.

Spacings between the adjacent source points along each firing course line ("oblique source point interval") is seen to be incrementally constant but increase in absolute values in cross directions away from the base line 71. The cross component ($y$) of a line coincident with the converging and diverging legs of the zigzag line 84 relates to its in-line component ($x$) and the cross and in-line values of the spacings of the center points of FIGS. 12, 13 and 14 in accordance with the general equation:

$$y = (md)/(ng) \, x$$

where $d$ is the offset (cross) spacing of adjacent center points, $g$ is the in-line spacing of adjacent center points, $n$ is an integer identifying the hydrophone station and $m$ is an integer identifying the midpoint between a respective source point-hydrophone pair. The angle of inclusion $\alpha$ of each line of source points is similarly related to both the in-line spacing and the cross spacing of the center points by:

$$\alpha = \tan^{-1}(d/g)$$

Further, where symmetry of adjacent center points is desired, the angle of intersection $\alpha$ of the converging and diverging legs should be about 45° while the cross component of the spacing of adjacent source points should be about equal (i) to the magnitude of the spacing interval X between adjacent hydrophones and (ii) to the in-line component of the oblique spacing interval of the source points, as shown.

In order to maintain center points $C_1', C_2', C_3' \ldots C_n'$, where $n$ is any cardinal integer, in correct alignment, the inline distances traversed by the recording and shooting boats between shots should be equal and remain constant during the collection process. Since the recording boat traverses between shots, an inline interval X, the in-line velocity of both boats as well as the repetition timing interval T between seismic shots can be directly related to the hydrophone spacing interval $X$ in accordance with the following equation:

$$X = V_o T$$

where $X$ is the spacing interval between adjacent hydrophones, $V_o$ is the in-line velocity of the boats parallel to base line 71 and $T$ is the constant repetitive firing interval of the seismic source along the zigzag course line 84. By maintaining the in-line velocity of the shot and recording boats at equal absolute values, the field procedure can be carried out in a manner in which the recording and shot boats change positions with respect to each other but in which the shooting boat remains, positionwise, arear of the hydrophone spread 73.

It is also apparent that the composite two-dimensional grid of center points produced by the collection method depicted in FIGS. 12–14, will include sets of center points aligned in directions traverse to the base line 71. As the collection process proceeds from left-to-right, as viewed, the individual sets continue to remain in traverse alignment and in correct horizontal spatial relationship, i.e. each set contains points having different, magnitudewise, hydrophone station-to-source point horizontal spacing.

We claim:

1. A seismic data collecting method for aiding in the determination of the three-dimensional stratal configuration of an earth formation underlying a body of water by means of a continuously moving marine seismic exploration system including a repetitive seismic source means and a plurality of hydrophones arranged in an in-line spread, said hydrophones being connected to a plurality of recording channels comprising the steps of:

a. moving, by recording boat means, said hydrophone spread having a constant spacing interval X between the individual hydrophones forming said plurality of hydrophones, said boat means moving at a velocity V along a base course line lying substantially in a plane coincident with said spread,
   b. moving, by shooting boat means, said seismic source means at a velocity V' along a heading defining an included angle $\alpha$ between an oblique course line for said shooting boat means and said base course line,
   c. controlling said headings and velocities of said recording boat means and said shooting boat means so that between all possible source point-hydrophone station pairs during the movement of said shooting boat means and said recording boat means along said oblique and base course lines, respectively, at known times a two-dimensional grid of center points is formed including cross sets of center points aligned along imaginary lines substantially perpendicular to the base course line,
   d. firing said seismic source means in sequence, at said known times along said oblique course line of said shooting boat means, to initiate travel of seismic energy downward toward seismic discontinuities within said earth formation,
   e. receiving at said plurality of hydrophones between firings of said seismic source means, separate reflection signals representative of energy received at said hydrophones as said hydrophones are instantaneously positioned at a plurality of hydrophone stations along said base course line so as to provide a series of traces, said traces containing cross sets of traces associated with said cross sets of center points, at least one trace of each of said cross sets of traces being associated with a respective source point-hydrophone station pair having a substantially different horizontal spacing from at least one other source point-hydrophone station pair of other traces associated with the same cross set of traces.

2. The method of claim 1 in which the velocities of the recording boat means and the shooting boat means are related to a time interval T between firings of the seismic source means such that the in-line advancement of the hydrophone spread and the in-line component of advancement of the seismic source means between shots are equal to about 2X where X is the spacing interval of the hydrophones, while the cross component of advancement of the seismic source normal to the base course line is equal to about half of its in-line component of advancement whereby spacing of said grid of center points is symmetrical in both in-line and cross directions.

3. The method of claim 2 in which said in-line advancements of said spread and the in-line component of advancement of said source means between firing of said source means are equal to:

$2X = VT$ and
   $2X = (V' \cos \alpha)T$ respectively.

4. The method of claim 3 in which said included angle $\alpha$ is equal to about 26 ½°.

5. The method of claim 1 in which the velocities of the recording boat means and the shooting boat means are related to the time interval T between firings of the seismic source means such that the in-line advancement of the hydrophone spread and the in-line component of advancement of the seismic source means between shots are equal to about X where X is the spacing interval of the hydrophones, while the cross component of advancement of the seismic source normal to the base course line is equal to about its in-line advancement whereby spacing of said grid of center points is symmetrical in both in-line and cross directions.

6. The method of claim 5 in which said in-line advancements of said spread and the in-line component of advancement of said source means between firing of said source means are equal to:

$X = VT$ and
   $X = (V' \cos \alpha)T$ respectively.

7. The method of claim 6 in which said included angle $\alpha$ is equal to about 45°.

8. In the method of claim 1 for aiding in determining the three-dimensional configuration of an earth formation underlying a body of water by means of the continuously moving marine exploration system including first and second seismic sources moving along first and second zigzag oblique course lines respectively, flanking the plurality of moving hydrophones constitiuting a hydrophone spread, steps (b), (c), and (d) thereof, being further characterized by the substeps of:

b'. moving, by means of a first shooting boat, said first seismic source along said first zigzag oblique course line comprising a series of discontinuous, oblique firing segments spaced in the direction of said base course line and joined to each other by a series of discontinuous oblique return segments, said first seismic source being moved along said first zigzag line at a velocity $V' = V/(\cos \alpha)$ where $\alpha$ is the angle defined between said series of oblique firing and return segments and said base course line,
   b''. moving, by means of a second shooting boat, flanking said first shooting boat on an opposite side of said base course line, said second seismic source along said second zigzag oblique course line also comprising a series of discontinuous, oblique firing segments spaced in the direction of said base course line and joined to each other by a series of discontinuous, oblique return segments, said second source being moved along said second zigzag line at a velocity $V' = V/(\cos \alpha)$ where $\alpha$ is the included angle between said series of oblique firing and return segments comprising said second zigzag course line and said base course line,
   c'. controlling the headings, velocities, and relative positions of said recording and shooting boats as said first and second seismic sources are moved along said first and second zigzag course lines, respectively, so that firing and return segments of said first zigzag course line are oriented in flanking relationship with return and firing segments, respectively, of said second zigzag course line to define a flanking spacing distance (D) measured along lines substantially perpendicular to the base course line, whereby between all possible source point-hydrophone station pairs when said pairs are located at instantaneous positions along said first and second zigzag course lines and said base course line cyclically occurring at a repetitive time interval T, a two-dimensional grid of center points is formed including cross sets of center points aligned along imaginary lines substantially perpendicular to the base course line, d'. firing one of said first and second source in sequence at said repetitive time interval T when said one source is intantaneously positionet at at least one of the instantaneous positions along one of the firing segments of one of the first and secon/ zigzag course lines to initiate travel of seismic energy downward toward seismic discontinuities within said earth formation, and d''. firing the other of said first and second seismic sources, in sequence, at said repetitive time interval T when said other seismic source is next positioned along a firing segment of its respective zigzag course line to initiate like travel of seismic energy downward toward said discontinuities within said earth formation.

9. The method in accordance with claim 8 in which substep (c') is further characterized by the substep of:

controlling said headings, velocities, and relative positions of said recording and shooting boats so that the flanking distance (D) between said first and second seismic sources during movement along said first and second zigzag course lines is substantially constant.

10. The method in accordance with claim 8 in which substep (c') is further characterized by the substep of:

controlling said headings, velocities, and relative positions of said recording and shooting boats so that the flanking distance (D) between said first and second seismic sources during movement along said first and second zigzag course lines, cyclically varies from a maximum value to a minimum value with respect to distance along said base course line in the direction of movement of said hydrophone spread.

11. The method in accordance with claim 8 in which substep (c') is further characterized by the substep of:

controlling said headings, velocities, and relative positions of said recording and shooting boats so that the shooting and recording boats remain substantially aflank of one another during the seismic data collection process.

12. The method in accordance with claim 8 in which substep (c') is further characterized by the substep of:

controlling said headings, velocities and relative positions of said boats so that said shooting boats remain substantially aflank of each other and of the midspan of said hydrophone spread along imaginary lines substantially perpendicular to the base course line.

13. The method of claim 1 including steps (a) through (e) with the additional steps of:

f. applying normal moveout corrections to said recorded series of traces produced at said spread of hydrophones to thereby provide a plurality of corrected traces, and g. beam steering each cross set of corrected traces associated with lines of center points substantially perpendicular to the base course line to produce subsets of cross directional traces having a significant signal-to-noise ratio for use in aiding in the determination of the three-dimensional stratal configuration of said earth formation underlying said body of water, multiply-reflected signals in each said cross set of original corrected traces being significantly attenuated as said corrected traces are beam steered.

14. The method of claim 1 in which the maximum total cross offset length of said grid of center points is less than 3000 feet.

15. The method of claim 1 in which the maximum total cross offset length of said grid of center points is less than 300 feet.

16. The method of claim 13 including the steps of (a) through (g) with the additional step of h. displaying the subsets of directional traces such that the final side-by-side placement of the traces comprises a plurality of sets of directional traces, each set consisting of at least two cross directional traces having a common cross moveout with respect to a vertical plane through said base course line so as to emphasize signals having the same common cross azimuth of emergence with respect to said vertical plane, but related to different in-line coordinate positions along the base course line, the different sets having different cross moveouts.

17. The method of claim 16 including the steps of (a) through (h) with the additional steps of:

i. determining the cross moveout of at least one seismic event by identifying which cross directional trace evidences at least one seismic event most prominently, and j. determining the in-line moveout of the said same event by the disparity in arrival time of said event on at least two directional traces having the same common cross moveout.

18. In the method of claim 1 for aiding in determining the three-dimensional configuration of an earth formation underlying a body of water by means of a continuously moving marine exploration system including a seismic source moving along a zigzag course line symmetrical to said base course line, steps (b), (c), and (d) thereof, being further characterized by the substeps of:

b'. moving, by means of a shooting boat means, said seismic source along said zigzag course line comprising a series of continuous, converging and diverging oblique legs in the direction of said base course line and joined to each other, said seismic source being moved along said zigzag course line at a velocity $V' = V/(\cos \alpha)$ where $\alpha$ is the angle defined between said series of oblique legs, and said base course line, c'. controlling the headings, velocities, and relative positions of said recording and shooting boat means as said seismic source is moved along said zigzag course line, whereby between all possible source point-hydrophone station pairs when said pairs are located at instantaneous positions along said zigzag course line and said base line at a cyclically repeating time interval T, a two-dimensional grid of center points is formed including cross sets of center points aligned along imaginary lines substantially perpendicular to the base course line, and d'. firing said source in sequence at said repetitive time interval T when said source is positioned at at least one of its instantaneous positions along said zigzag course line to initiate travel of seismic energy downward toward seismic discontinuities within said earth formation.

19. The method in accordance with claim 18 in which the substep (c') is characterized by the substep of:

controlling said headings, velocities and relative positions of said recording and shooting boat means so that the shooting boat means remains arrear of said hydrophone spread.

20. A seismic data collecting method for aiding in the determination of the three-dimensional stratal configuration of an earth formation underlying a body of water by means of a continuously moving marine seismic exploration system including a repetitive seismic source means and a plurality of hydrophones arranged in an in-line spread, said hydrophones being connected to a plurality of recording channels comprising the steps of:

a. moving, by recording boat means, said hydrophone spread having a constant spacing interval X between the individual hydrophones forming the plurality of hydrophones, said spread being moved at a veloxity V along a base course line, b. moving, by shooting boat means, said seismic source means at a velocity V' along an oblique course line at an angle $\alpha$ with respect to said base course line, c. controlling said recording boat means and said shooting boat means so that between all possible source point-hydrophone station pairs a two-dimensional grid of center points is formed including cross sets of center points aligned along imaginary lines substantially perpendicular to the base course line, d. firing said seismic source means in sequence, at known times, along said oblique course line of said shooting boat means to initiate travel of seismic energy downward toward seismic discontinuities within said earth formation, e. receiving at said plurality of hydrophones during the time interval between firings, separate reflection signals so as to provide a series of traces, said traces containing cross sets of traces associated with said cross sets of center points, at least one trace of each said cross set of traces being associated with a respective source point-hydrophone station pair having a substantially different horizontal spacing from at least one other source point-hydrophone station pair.

21. The method of claim 20 in which the velocities of the recording boat means and the shooting boat means are related to a time interval T between firings of the seismic source means such that the in-line advancement of the hydrophone spread and the in-line component of advancement of the seismic source means between shots are equal to about 2X where X is the spacing interval of the hydrophones, while the cross component of advancement of the seismic source normal to the base course line is equal to about half of its in-line component of advancement whereby spacing of said grid of center points is symmetrical in both in-line and cross directions.

22. The method of claim 21 in which said in-line advancements of said spread and the in-line component of advancement of said source means between firing of said source means are equal to:

$2X = VT$ and
$2X = (V' \cos \alpha)T$ respectively.

* * * * *